(12) United States Patent
Hornby

(10) Patent No.: US 7,905,425 B2
(45) Date of Patent: Mar. 15, 2011

(54) MODULAR OUTWARD OPENING SOLENOID DIRECT FUEL INJECTOR

(75) Inventor: Michael J. Hornby, Williamsburg, VA (US)

(73) Assignee: Continental Automotive Sytems US, Inc., Auburn Hills ( * ) Notice: Subject to any disclaimer, the term of this patent is extended or adjusted under 35 U.S.C. 154(b) by 255 days.

(21) Appl. No.: 12/292,368

(22) Filed: Nov. 18, 2008

(65) Prior Publication Data
US 2010/0123030 A1 May 20, 2010

(51) Int. Cl.
*F02D 1/06* (2006.01)
(52) U.S. Cl. .... 239/5; 239/585.3; 239/585.1; 239/585.5; 239/900; 29/890.12
(58) Field of Classification Search ............... 239/585.1, 239/585.3, 585.5, 900; 29/890.12
See application file for complete search history.

(56) References Cited

U.S. PATENT DOCUMENTS

| 6,079,642 | A  | * | 6/2000  | Maier       | 239/585.1  |
| 6,145,761 | A  | * | 11/2000 | Muller et al. | 239/533.12 |
| 6,431,472 | B1 |   | 8/2002  | Tian et al. |            |
| 6,494,389 | B1 | * | 12/2002 | Reiter      | 239/585.1  |
| 6,520,433 | B2 | * | 2/2003  | Miura et al. | 239/585.1  |
| 7,175,114 | B2 | * | 2/2007  | Hans        | 239/585.1  |

* cited by examiner

*Primary Examiner* — Dinh Q Nguyen

(57) ABSTRACT

A module, direct fuel injector (10) includes a fuel module (46) having a valve body (12) defining an outlet opening (20) and including a seating surface (18). A needle 14, disposed in valve body, has a sealing surface (16). An armature (28) is coupled with the needle such that movement of the armature moves the needle between a closed position with the sealing surface engaging the seating surface and an open position with the needle moving outwardly from the valve body with the sealing surface being disengaged from the seating. A spring (38) biases the armature and thus the needle to the closed position. An inlet tube (22) is coupled to the fuel module defining an inlet of the injector. A power assembly (42) is separate from, but coupled to, the fuel module. The power assembly includes an electromagnetic coil (44) for causing movement of the armature, and a connector (43).

20 Claims, 2 Drawing Sheets

MODULAR OUTWARD OPENING SOLENOID DIRECT FUEL INJECTOR

TECHNICAL FIELD

The present disclosure relates to a direct fuel injector for supplying fuel to an engine of a vehicle.

BACKGROUND

Typical piezo-type fuel injectors for automobiles have outward opening valves that are very fast responding but are costly. Typical direct injector solenoid valves have inward opening valves but they are not resistant to fuel coking. Injector coking is a problem in direct injected internal combustion engines because the injectors are in contact with the harsh environment of the combustion chamber. Due to high temperatures, fuel decomposes in the injector nozzle and lays down a deposit which both restricts flow, and distorts the symmetry of the spray. As this deposit grows with operation, the internal dimensions of the nozzle change.

The buildup of deposits in the combustion chamber can alter engine performance by impairing fuel economy, regulated emissions, and drivability, and in the worst case scenario cause engine damage.

Another disadvantage of conventional fuel injectors is the occurrence of scrap during the manufacturing of the injector.

SUMMARY

There is a need to provide a modular direct fuel injector for an automobile having a solenoid in conjunction with an outwardly opening valve that provides the benefits of a piezo-type injector at the cost of a solenoid injector.

An object of the invention is to fulfill the need referred to above. In accordance with the principles of the present invention, this objective is achieved by providing a module, direct fuel injector including a fuel module having a valve body defining at least a first portion of a flow passage through the injector. The valve body defines an outlet opening and includes a seating surface at a distal end thereof. The fuel module includes a needle disposed in the flow passage in the valve body. The needle has first and second ends with the second end having a sealing surface associated with the seating surface. The fuel module includes a movable armature coupled with the first end of the needle such that movement of the armature moves the needle between a closed position with the sealing surface engaging the seating surface to prevent fuel from passing through the outlet opening, and an open position with at least a portion of the needle moving outwardly from the distal end of valve body with the sealing surface being disengaged from the seating surface to permit fuel to pass through the outlet opening. The armature has a fluid flow passage there-through. The fuel module also includes a spring constructed and arranged to bias the armature and thus the needle to the closed position. The injector includes an inlet tube coupled to the fuel module and defining another portion of the flow passage that communicates with the first portion of the flow passage via the fluid flow passage through the armature, and a power assembly separate from, but coupled to, at least the fuel module. The power assembly includes an electromagnetic coil associated with the armature for causing movement of the armature, and a connector for powering the electromagnetic coil.

In accordance with another aspect of an embodiment, the invention, a method of assembling a module, direct fuel injector provides a fuel module including a valve body defining at least a first portion of a flow passage through the injector, the valve body defining an outlet opening and including a seating surface at a distal end thereof; a needle disposed in the flow passage in the valve body, the needle having first and second ends, the second end having a sealing surface associated with the seating surface; a movable armature coupled with the first end of the needle such that movement of the armature moves the needle between a closed position with the sealing surface engaging the seating surface to prevent fuel from passing through the outlet opening and an open position with at least a portion of the needle moving outwardly from the distal end of valve body with the sealing surface being disengaged from the seating surface to permit fuel to pass through the outlet opening, the armature having a fluid flow passage therethrough; and a spring constructed and arranged to bias the armature and thus the needle to a closed position with the sealing surface engaging the seating surface. An inlet tube is provided having an inlet end and an opposing. A non-magnetic tube is coupled to the opposing end of the inlet tube to define an inlet tube assembly. The inlet tube assembly is then coupled to the fuel module so that the inlet tube defines another portion of the flow passage that communicates with the first portion of the flow passage via the fluid flow passage through the armature. A power assembly, separate from the fuel module, is then coupled to the fuel module. The power assembly includes an electromagnetic coil associated with the armature for causing movement of the armature, and a connector for powering the electromagnetic coil.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXAMPLE EMBODIMENTS

Figure 1:
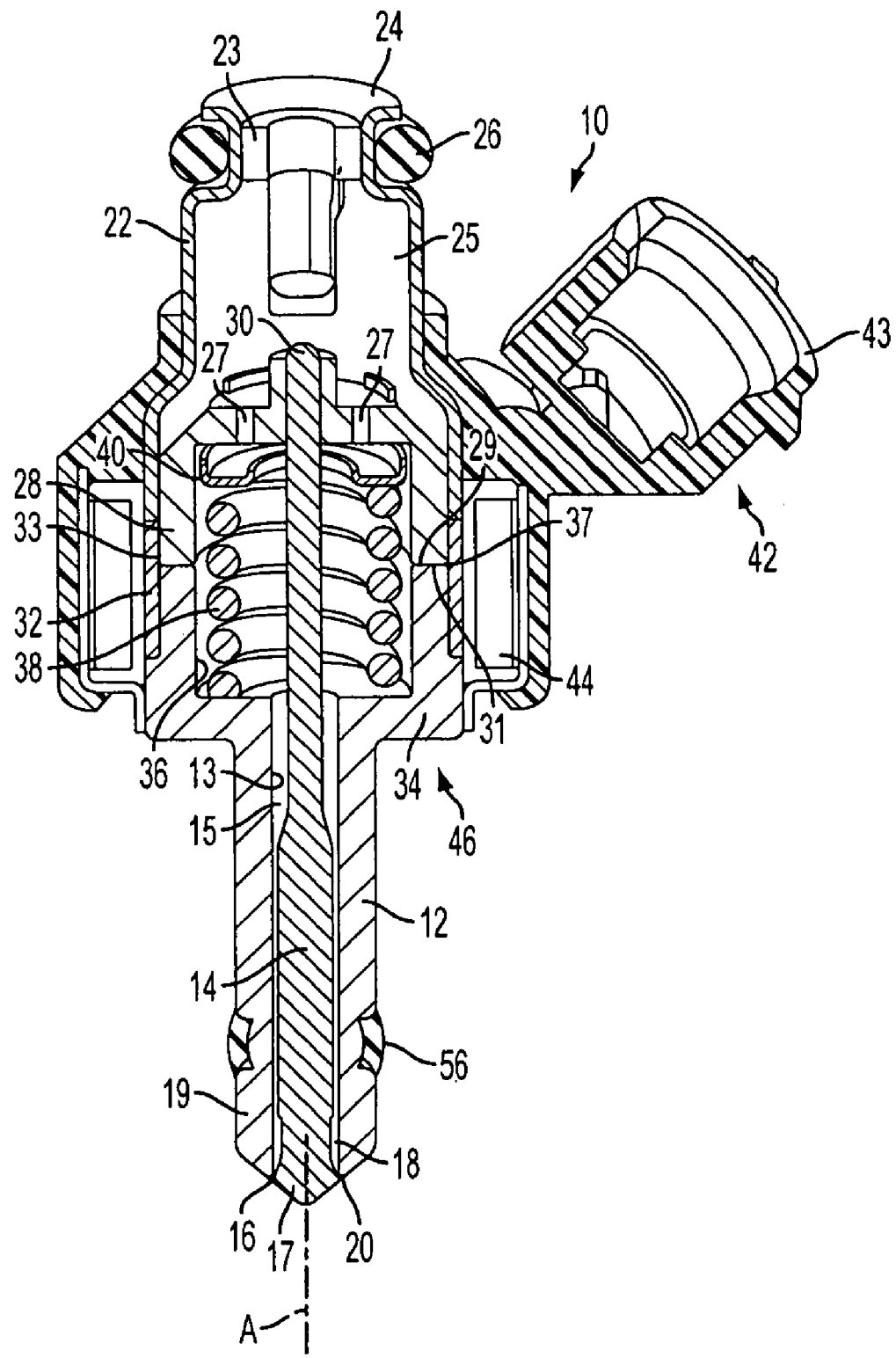
FIG. 1 is a sectional view of an outward opening solenoid direct injector provided in accordance with an example embodiment of the present invention.

Referring to FIG. 1, module, outward opening solenoid direct fuel injector is shown, generally indicated at 10, for supplying fuel to an internal combustion engine (not shown) of an automobile. The direct fuel injector 10 includes a valve body 12 extending along a longitudinal axis A. The valve body 12 defines at least a first portion 13 of a flow passage 15 through the injector 10. At least a portion of a needle 14 is provided in the first portion 13 of the flow passage 15 of the valve body 12. The needle 14 is moveable between a first, seated, i.e., closed, position and a second, open position for controlling the flow of fuel through the injector 10. In the closed position as shown in FIG. 1, an annular sealing surface 16 of an end 17 of the needle 14 is engaged with a mating annular seating surface 18 of the valve body 12 thereby closing the outlet opening 20 and preventing fuel flow. In the open position, the needle 14 moves outwardly from the distal end 19 of the valve body 12 so that the sealing surface 16 is moved away and disengaged from the seating surface 18 to allow fuel flow through the outlet opening 20. The seating surface 18 is defined at the distal end 19 of the valve body 12.

An inlet tube 22 defines an inlet end 24 of the injector 10 and defines a second portion 25 of the flow passage 15 of the injector that communicates with the first portion 13 of the flow passage 15 through at least one flow passage 27 in an armature 28. Thus, the flow passage 15 is defined through the inlet tube 22, through opening(s) 27 in the armature 28 and through the valve body 12 such that fuel introduced into the inlet end 24 can flow through the outlet opening 20 when the needle 14 is in the open position. The inlet tube 22 is constructed and arranged for mounting the fuel injector 10 in a fuel rail (not shown) as is known. An O-ring 26 is used to seal the inlet end 24 in the fuel rail. A filter 23 is provided in the inlet tube 22 at the inlet end 24 to filter the fuel entering the inlet end 24. A non-magnetic tube 32 is coupled to an end 33 of the inlet tube opposite the inlet end 24 to define an inlet tube assembly, generally indicated at 35 in FIG. 2b. The function of the non-magnetic tube 32 will be described below.

The armature 28 is coupled (e.g., welded) to the first end 30 of the needle 14 and is axially moveable along axis A. Thus, the ferrous armature 28 is of generally cup-shape having an open end 29 and a portion 34 of the valve body 12 is of generally cup-shape having an open end 31. The opens ends 29 and 31 of the armature 28 and valve body 12 face each other to define a spring receiving volume 36. A spring 38, received in the volume 36, biases the armature 28 and thus needle 14 to the closed position, with an annular sealing surface 16 of the needle 14 engaging an annular seating surface 18 of the valve body 12. A small gap 37 is provided between the open ends 29 and 31 when the needle 14 is in the closed position. The end 31 of the valve body 12 defines a stop surface engaged by the end 29 of the armature 28 when the needle 14 is in the open position. The valve body 12 defines a stator.

Figure 2C:
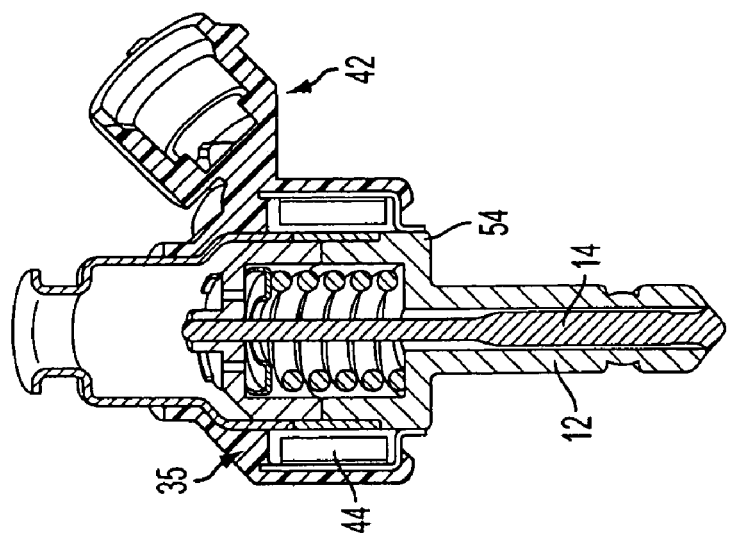
FIG. 2c shows a third stage of assembly of the fuel injector of FIG. 1.

An adjusting member or sleeve 40 is provided between the armature 28 and the spring 38 to adjust the bias of the spring 32 on the armature 28. In particular, and as best shown in FIG. 2a, the adjusting member 40 is joined preferably by laser welding tabs 41 of the adjusting member 40 to the armature 28. The adjusting member can be adjusted by moving the adjustment member 40 axially with respect to the spring 32, before joining with the armature 28, to preload the spring 38 to a desired biasing force. This adjustment controls the speed at which the injector 10 will open and close, thus calibrating the dynamic flow of the fuel injector 10. In addition, the lift of the needle 14 (amount the needle 14 opens) can be set by controlling the location at which the armature 28 is coupled to the end 30 of the needle 14.

A power assembly, generally indicated at 42, includes an electromagnetic coil 44 that surrounds at least a portion of the inlet tube 24 and thus a portion of the ferrous armature 28 with the non-magnetic tube 32 there-between. The non-magnetic tube 32 is generally adjacent to the open ends 29, 31 of the armature 28 and inlet tube portion 34, respectively, with the conventional air gap defined, so as to control magnetic flux. The power assembly 42 includes an electrical connector 43 for powering the electromagnetic coil 44. The electromagnetic coil 44 is operable, in the conventional manner, to produce a magnetic field to move the ferrous armature 28 downwardly, thereby moving the sealing surface 16 of the needle from the seating surface 18 allowing fuel to pass through the fuel outlet opening 20. Deactivation of the electromagnetic coil 44 allows the spring 38 to bias the armature 28 and thus the needle 14 upwardly so the sealing surface 16 of the needle 14 engages the seating surface 18 in a sealed manner, thereby closing the outlet opening 20 so fuel will not pass therethrough. The electromagnetic coil 44 uses the conventional pulse width DC modulation to open and close the injector 10.

The direct fuel injector 10 is of modular configuration so as to reduce parts and to reduce scrap during manufacturing. The assembly of the direct fuel injector 10 will be appreciated with reference to FIGS. 2a-2c and FIG. 1. As shown in FIG. 2a, a fuel module, generally indicated at 46, is built. The fuel module includes the valve body 12, the armature 28 with the needle 14 joined thereto by laser weld 48, the spring 38, and the adjusting member 40 joined to the armature 28 by laser weld. In building the fuel module 46, the lift and the dynamic flow are set as described above.

Figure 2B:
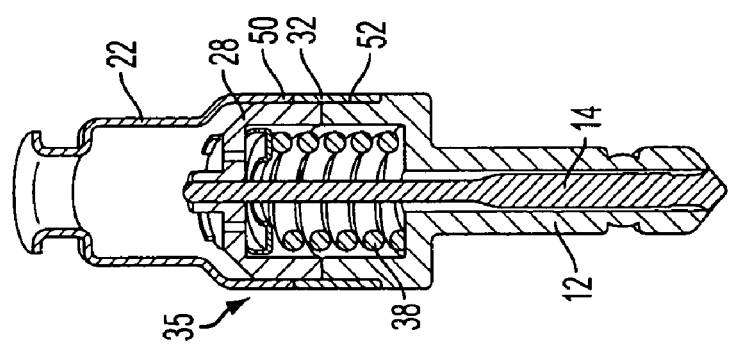
FIG. 2b shows a second stage of assembly of the fuel injector of FIG. 1.
Figure 2A:
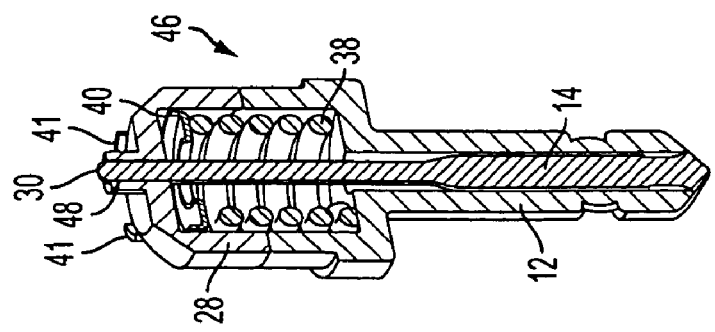
FIG. 2a shows a first stage of assembly of the fuel injector of FIG. 1.

FIG. 2b shows the next step of assembly wherein the non-magnetic tube 32 is coupled to the end of the inlet tube 22, preferably by a laser weld 50 to define the inlet tube assembly 35. This assembly 35 is coupled to the valve body 12 of the fuel module 46, also preferably by a laser weld 52.

FIG. 2c shows the power assembly 42 pressed onto the inlet tube assembly 35 and welded to the valve body 12 via a weld 54. Thus, the power assembly 42 is separate from the fuel module 46 but coupled thereto.

FIG. 1 shows the completed injector 10 with O-ring 26 and lower seal 56 installed.

The inlet tube 22 and valve body 12 are preferably of stainless steel and thus define stainless steel portions of the fuel passage 15. The modular configuration allows the injector 10 to be calibrated and tested on a sub-assembly basis. In addition, the power assembly 42 can be manufactured in a place different from where the fuel module is assembled. In addition, the modular configuration enables easy change of fuel injector length and for change in connector types.

Since the injector 10 is outward opening, cocking resistance is improved. The injector 10 can be used in alcohol, gasoline, and flex fuel applications. The injector 10 is of lower cost than conventional outward opening injectors since it has fewer components, less welds, and fewer manufacturing steps than conventional injectors. The use of a solenoid (coil 44) in conjunction with the outwardly opening valve (needle 14) provides the benefits of a piezo-type injector at the cost of a solenoid injector.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A module, outwardly opening direct fuel injector comprising:
   a fuel module comprising:
      a valve body defining at least a first portion of a flow passage through the injector, the valve body defining an outlet opening and including a seating surface at a distal end thereof,
      a needle disposed in the flow passage in the valve body, the needle having first and second ends, the second end having a sealing surface associated with the seating surface, a movable armature coupled with the first end of the needle such that movement of the armature moves the needle between a closed position with the sealing surface engaging the seating surface to prevent fuel from passing through the outlet opening and an open position with at least a portion of the needle moving outwardly from the distal end of valve body to extend outwardly from the outlet opening with the sealing surface being disengaged from the seating surface to permit fuel to pass through the outlet opening, the armature having a fluid flow passage there-through, and a spring constructed and arranged to bias the armature and thus the needle to the closed position, an inlet tube coupled to the fuel module and defining another portion of the flow passage that communicates with the first portion of the flow passage via the fluid flow passage through the armature, and a power assembly separate from, but coupled to, at least the fuel module, the power assembly including an electromagnetic coil associated with the armature for causing movement of the armature, and a connector for powering the electromagnetic coil.

2. The injector of claim 1, wherein the armature is of generally cup-shape having an open end and a portion of the valve body is of generally cup-shape having an open end, the opens ends of the armature and valve body facing each other to define a spring receiving volume, the spring being received in the volume.

3. The injector of claim 2, wherein a gap is provided between the open ends of the armature and valve body in the closed position of the needle and wherein, in the open position of the needle, the open end of the armature engages the open end of the valve body thereby limiting movement of the armature.

4. The injector of claim 1, further comprising a non-magnetic tube coupled to the inlet tube and disposed between the armature and the electromagnetic coil.

5. The injector of claim 1, further comprising an adjusting member between the armature and the spring constructed and arranged to adjust the bias of the spring on the armature.

6. The injector of claim 1, wherein the seating surface is an annular surface.

7. The injector of claim 6, wherein the sealing surface is an annular surface constructed and arranged to mate with the annular seating surface.

8. The injector of claim 1, further comprising a laser weld coupling the power assembly to the fuel module.

9. A module, outwardly opening direct fuel injector comprising:

a fuel module comprising:

a valve body defining at least a first portion of a flow passage through the injector, the valve body defining an outlet opening and including a seating surface at a distal end thereof, means, disposed in the flow passage in the valve body, for controlling flow through the outlet opening, the means for controlling having first and second ends, the second end having a sealing surface associated with the seating surface, a movable armature coupled with the first end of the means for controlling such that movement of the armature moves the means for controlling between a closed position with the sealing surface engaging the seating surface to prevent fuel from passing through the outlet opening and an open position with at least a portion of the means for controlling moving outwardly from the distal end of valve body to extend outwardly from the outlet opening with the sealing surface being disengaged from the seating surface to permit fuel to pass through the outlet opening, the armature having a fluid flow passage there-through, and means for biasing the armature and thus the means for controlling to the closed position, an inlet tube coupled to the fuel module and defining another portion of the flow passage that communicates with the first portion of the flow passage via the fluid flow passage through the armature, and a power assembly separate from, but coupled to, at least the fuel module, the power assembly including an electromagnetic coil associated with the armature for causing movement of the armature, and a connector for powering the electromagnetic coil.

10. The injector of claim 9, wherein the armature is of generally cup-shape having an open end and a portion of the valve body is of generally cup-shape having an open end, the opens ends of the armature and valve body facing each other to define a spring receiving volume, the means for biasing comprising a spring received in the volume.

11. The injector of claim 10, wherein a gap is provided between the open ends of the armature and valve body in the closed position of the means for controlling and wherein, in the open position of the means for controlling, the open end of the armature engages the open end of the valve body thereby limiting movement of the armature.

12. The injector of claim 9, further comprising a non-magnetic tube coupled to the inlet tube and disposed between the armature and the electromagnetic coil.

13. The injector of claim 9, further comprising an adjusting member, between the armature and the means for biasing, constructed and arranged to adjust the bias of the spring on the armature.

14. The injector of claim 9, wherein the seating surface is an annular surface and the sealing surface is an annular surface constructed and arranged to mate with the annular seating surface.

15. The injector of claim 9, further comprising a laser weld coupling the power assembly to the fuel module.

16. A method of assembling a module, direct fuel injector, the method comprising:

providing a fuel module comprising:

a valve body defining at least a first portion of a flow passage through the injector, the valve body defining an outlet opening and including a seating surface at a distal end thereof, a needle disposed in the flow passage in the valve body, the needle having first and second ends, the second end having a sealing surface associated with the seating surface, a movable armature coupled with the first end of the needle such that movement of the armature moves the needle between a closed position with the sealing surface engaging the seating surface to prevent fuel from passing through the outlet opening and an open position with at least a portion of the needle moving outwardly from the distal end of valve body with the sealing surface being disengaged from the seating surface to permit fuel to pass through the outlet opening, the armature having a fluid flow passage there-through, and a spring constructed and arranged to bias the armature and thus the needle to a closed position with the sealing surface engaging the seating surface, providing an inlet tube having an inlet end and an opposing end, coupling a non-magnetic tube to the opposing end of the inlet tube to define an inlet tube assembly, coupling the inlet tube assembly to the fuel module so that the inlet tube defines another portion of the flow passage that communicates with the first portion of the flow passage via the fluid flow passage through the armature, and coupling a power assembly, separate from the fuel module, to the fuel module, the power assembly including an electromagnetic coil associated with the armature for causing movement of the armature, and a connector for powering the electromagnetic coil.

17. The method of claim 16, wherein the step of providing the fuel module includes providing an adjusting member between the armature and the spring, the method further including, prior to the step of coupling inlet tube assembly, the step of moving the adjusting member to adjust the bias of the spring on the armature.

18. The method of claim 16, wherein prior to the step of coupling inlet tube assembly, the method further includes setting a lift of the needle by selecting a location at which an end of the needle is coupled with the armature.

19. The method of claim 16, wherein the coupling steps include using laser welds.

20. The method of claim 16, wherein the step of coupling the power assembly includes pressing the power assembly onto the inlet tube assembly and laser welding the power assembly to the valve body.

* * * * *